July 24, 1923.
B. E. BARNES
PULLEY BLOCK
Filed June 8, 1922
1,462,631
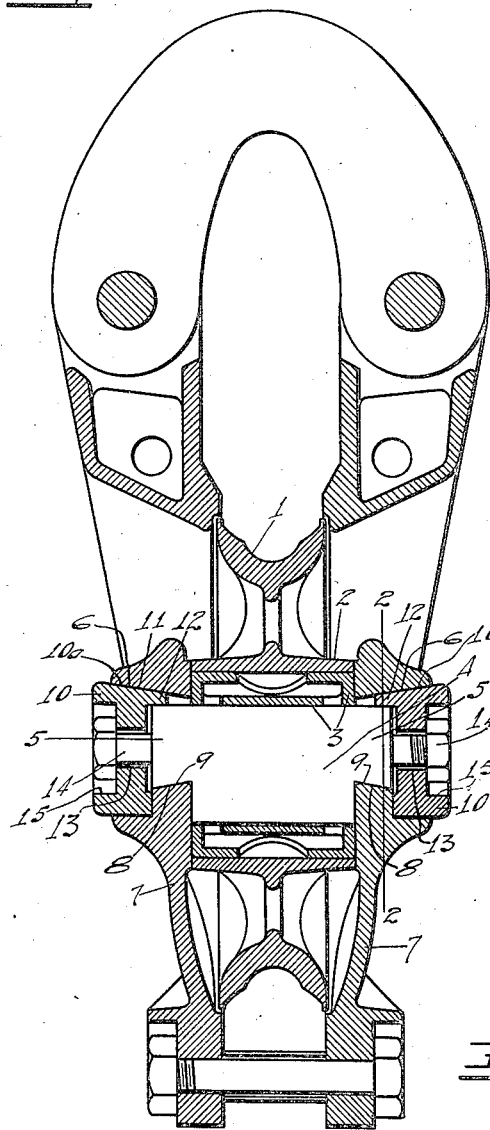
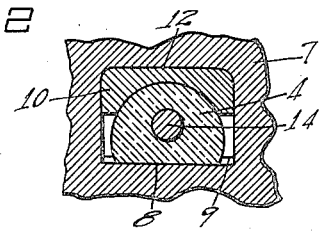
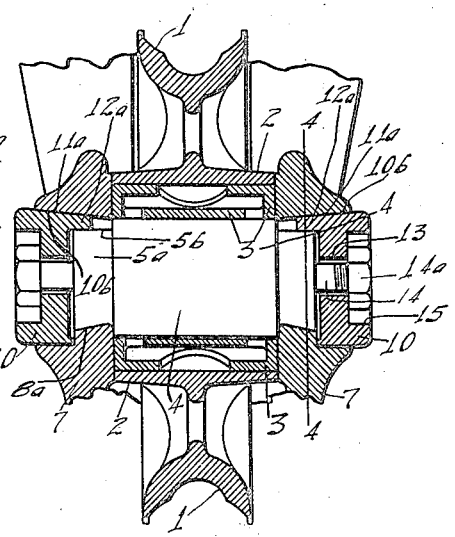
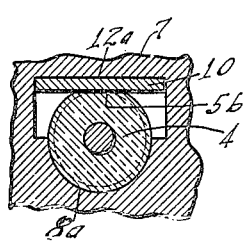
Inventor
Brown E. Barnes
Attorney Patented July 24, 1923.

1,462,631

UNITED STATES PATENT OFFICE.

BROWN E. BARNES, OF PORTLAND, OREGON, ASSIGNOR TO WILLAMETTE IRON & STEEL WORKS, OF PORTLAND, OREGON, A CORPORATION OF OREGON.

PULLEY BLOCK.

Application filed June 8, 1922. Serial No. 566,863.

*To all whom it may concern:*

Be it known that I, BROWN E. BARNES, a citizen of the United States, residing at Portland, in the county of Multnomah and State of Oregon, have invented new and useful Improvements in Pulley Blocks, of which the following is a specification.

This invention is designed to improve the construction of a pulley block, particularly the mounting of the journal pin, the construction making a very much more rigid and secure mounting for the pin and at the same time leaving the block with less obstruction on the sides than with blocks as ordinarily constructed. Further the construction tends to lock the cheeks of the pulley block together so as to strengthen the structure. Other details of the invention will appear from the specification and claims.

The invention is illustrated in the accompanying drawings as follows:—

Fig. 1 shows a central vertical section through a pulley block.

Fig. 2 a section on the line 2—2 in Fig. 1.

Fig. 3 a view similar to Fig. 1 of an alternative construction.

Fig. 4 a section on the line 4—4 in Fig. 3.

1 marks the sheave, 2 the hub of the sheave, 3 a bearing bushing fixed in the sheave, and 4 the sheave pin.

The sheave pin has the locking extensions 5 which extend into openings 6 in the cheek pieces 7. One wall of the opening 6 has a wedging or locking surface 8 and the extensions 5 have the undercut surfaces 9 which rest on the surfaces 8. It will readily be seen that if these surfaces are locked together the cheek pieces are locked against spreading. The wedge blocks 10 have the wedging surfaces 10$^a$ which operate against the wedging surfaces 11 at the opposite side of the opening 6 from the surface 8. The wedge blocks have the wedge projections 12 which extend between the surfaces 11 and the extensions 5 at a point opposite the locking surfaces 9. The wedge blocks 10 have perforations 13 and a tie bolt 14 extends through these perforations, the head 14 at one end and nut 14$^a$ at the opposite end being arranged in sockets 15 in the wedge blocks 10.

As the tie rod is tightened drawing the wedge blocks 10 inwardly the wedging lip 12 wedges between the surface 11 and the surface of the extension 5 thus clamping the undercut portion of the extension on the surface 8. Thus the pin locks the cheeks against spreading and the pin receives the thrust of the sheave directly, the tie rod being relieved of all lateral strain.

The undercut portion 9 in the construction shown in Figs. 1 and 2 is flat and engages the flat surface 8, thus locking the pin 4 against rotation. In Figs. 3 and 4 the extension 5$^a$ is tapered or cone shaped and rests on the surface 8$^a$ conforming to the shape of the extension. The upper portion of the extension is flattened at 5$^b$ and the wedge block has wedging surfaces 10$^b$ operating against a flat wedging surface 11$^a$, the lip 12$^a$ wedging between the surface 11$^a$ and the flattened portion 5$^b$ thus not only forcing the extension into locking engagement with the walls of the opening but locking the pin against rotation.

What I claim as new is:—

1. In a pulley block, the combination of a sheave; cheek pieces; a bearing pin for the sheave mounted in the cheek pieces with an undercut connection; and a tie rod extending through the pin securing the pin and cheek pieces.

2. In a pulley block, the combination of a sheave; cheek pieces; and a bearing pin for the sheave mounted in the cheek pieces with an undercut connection.

3. In a pulley block, the combination of a sheave; cheek pieces for the sheave; a bearing pin for the sheave mounted in the cheek pieces with an undercut connection; locking pieces clamping the connection; and means exerting clamping pressure on the locking pieces.

4. In a pulley block, the combination of a sheave; cheek pieces for the sheave; a bearing pin for the sheave mounted in the cheek pieces with an undercut connection; locking pieces clamping the connection; and a tie rod between the locking pieces exerting clamping pressure thereon.

5. In a pulley block, the combination of a sheave; cheek pieces for the sheave; a bearing pin for the sheave mounted in the cheek pieces with an undercut connection; locking pieces clamping the connection; and a tie rod between the locking pieces exerting clamping pressure thereon, said locking pieces having sockets receiving the heads of the tie rod.

6. In a pulley block, the combination of a sheave; cheek pieces; a bearing pin for the sheave mounted in the cheek pieces with an undercut connection; and means for locking the pin against rotation.

7. In a pulley block, the combination of a sheave; cheek pieces for the sheave; a bearing pin for the sheave mounted in the cheek pieces with an undercut connection; wedge blocks clamping the connection; and means exerting clamping pressure on the wedge blocks, said wedge blocks locking the pin against rotation.

8. In a pulley block, the combination of a sheave; a pin on which the sheave is journaled, said pin having locking undercut extensions; cheek pieces having openings receiving the extensions with walls locking therewith having opposing wedge surfaces; and wedge blocks wedging between the wedge surfaces and the extensions.

9. In a pulley block, the combination of a sheave; a pin on which the sheave is journaled, said pin having locking undercut extensions; cheek pieces having openings receiving the extensions with walls locking therewith having opposing wedge surfaces; wedge blocks wedging between the wedge surfaces and the extensions; and means exerting pressure on the blocks.

10. In a pulley block, the combination of a sheave; a pin on which the sheave is journaled, said pin having locking undercut extensions; cheek pieces having openings receiving the extensions with walls locking therewith having opposing wedge surfaces; wedge blocks wedging between the wedge surfaces and the extensions; and tie rods extending between the blocks through the pin.

11. In a pulley block, the combination of a sheave; a pin on which the sheave is journaled, said pin having locking undercut extensions; cheek pieces having openings receiving the extensions with walls locking therewith having opposing wedge surfaces; wedge blocks wedging between the wedge surfaces and the extensions; and tie rods extending between the blocks through the pin, said wedge blocks having sockets receiving the heads of the tie rods.

In testimony whereof I have hereunto set my hand.

BROWN E. BARNES.